US006985947B1

(12) United States Patent
Gbadegesin

(10) Patent No.: US 6,985,947 B1
(45) Date of Patent: Jan. 10, 2006

(54) SERVER ACCESS CONTROL METHODS AND ARRANGEMENTS

(75) Inventor: Abolade Gbadegesin, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 915 days.

(21) Appl. No.: 09/661,050

(22) Filed: Sep. 14, 2000

(51) Int. Cl.
*G06F 15/16* (2006.01)

(52) U.S. Cl. ..................................................... 709/225

(58) Field of Classification Search ................ 709/224, 709/225, 203, 223
See application file for complete search history.

(56) References Cited

U.S. PATENT DOCUMENTS

| 6,256,739 B1 * | 7/2001 | Skopp et al. ............... 713/201 |
| 6,363,489 B1 * | 3/2002 | Comay et al. .............. 713/201 |
| 6,574,656 B1 * | 6/2003 | Nagaoka et al. ............ 709/201 |

OTHER PUBLICATIONS

Microsoft Press Computer Dictionary, Third Edition, 1997, Microsoft Press, p. 327.*

* cited by examiner

*Primary Examiner*—Glenton B. Burgess
*Assistant Examiner*—Aaron Strange
(74) *Attorney, Agent, or Firm*—Lee and Hayes, PLLC

(57) ABSTRACT

In accordance with certain aspects of the present invention, improved methods and arrangements for controlling access to a network server in a client-server environment are provided. In accordance with certain implementations, user software selectively specifies a list of network interfaces or addresses on which connections are to be accepted. This "listing" is provided to the network server software and used to selectively filter (accept/reject) connection requests associated with a wildcard socket. The network server software essentially treats the wildcard socket as if the network server bound it not to the wildcard address, but instead to all of the network interfaces and/or addresses specified. The various methods and arrangements are applicable to file-sharing software, all TCP-based and UDP-based client-server software, including HTTP servers, digital media servers, DNS servers, database servers, etc.

30 Claims, 5 Drawing Sheets

SERVER ACCESS CONTROL METHODS AND ARRANGEMENTS

TECHNICAL FIELD

This invention relates to computers and computer networks, and more particularly to methods and arrangements for use in controlling access to servers in a client-server communication environment.

BACKGROUND

There is a continuing need for improved methods and arrangements for controlling access to network servers or like devices, especially in the Internet/intranet networking arena. The network server logic (e.g., software) can usually be divided into an application or user-side portion, and an operating system or kernel-side portion. These two portions are required to work together during a client server communication session.

Server devices typically include at least one "network server" software program that is operatively configured along with hardware to receive requests from one or more client devices over a network and in response perform one or more services expressed in the request(s) on the clients' behalf. For example, "Berkeley Sockets" is one name given to an application-programming interface (API) that is commonly used to implement network servers on the Internet and other like networks. Windows™ Sockets is the name given to certain versions of another API associated with the Windows™ platform available from Microsoft Corporation of Redmond, Wash., and configurable for use on various networks, including, for example, the Internet, intranets, LANs, etc.

In an IP network, each network server typically has one or more network interfaces, each having one or more IP addresses assigned thereto. For the sake of security, improved manageability, load-distribution, and/or other reasons, it is often desirable to limit or otherwise restrict the number or set of network interfaces and/or IP addresses via which the network server will accept requests. Thus there is a need to control which client can access the server.

Conventional control methodologies tend to: (1) place a heavy burden on the kernel-side software by requiring the opening and management of a plurality of communication sockets, each being bound to a specific network/address; or, (2) place a heavy burden on the user-side software by having the network server software open a wildcard socket bound to several networks that relies on the user software for the requisite management/policing. Method (1) usually requires complicated software and significant resources. Method (2) requires fewer resources, but is more vulnerable to denial of service attacks when over loaded with client requests, and does not always provide sufficient information to terminated client nodes regarding the reason for the rejection/termination.

SUMMARY

In accordance with certain aspects of the present invention, improved methods and arrangements for controlling access to the network server in a client-server environment are provided.

In accordance with certain implementations, user software selectively specifies a list of network interfaces or addresses on which connections are to be accepted. This "listing" is provided to the network server software and used to selectively filter (accept/reject) connection requests associated with a wildcard socket. The network server software essentially treats the wildcard socket as if the network server bound it not to the wildcard address, but instead to all of the network interfaces and/or addresses specified.

The various methods and arrangements are applicable to file-sharing software, all TCP-based and UDP-based client-server software, including HTTP servers, digital media servers, DNS servers, database servers, etc.

By way of further summary/example, the above stated needs and others are met by a method for controlling access to a server device by at least one client device that is connected to the server device through at least one interconnecting network. The method includes having a user-side portion of a network server logic within the server device specify at least one or more networks from which the user-side portion would accept client device information. The method further includes having a kernel-side portion of the network server logic accept the client device information from the interconnecting network only if the client device information has been provided via the specified network.

BRIEF DESCRIPTION OF THE DRAWINGS

A more complete understanding of the various methods and arrangements of the present invention may be had by reference to the following detailed description when taken in conjunction with the accompanying drawings wherein:

FIG. 4 is a block diagram similar to FIG. 3 depicting yet another conventional server software architecture having only a single communication socket provided between a network interface protocol driver program or the like and an application or the like.

DETAILED DESCRIPTION

Figure 1:
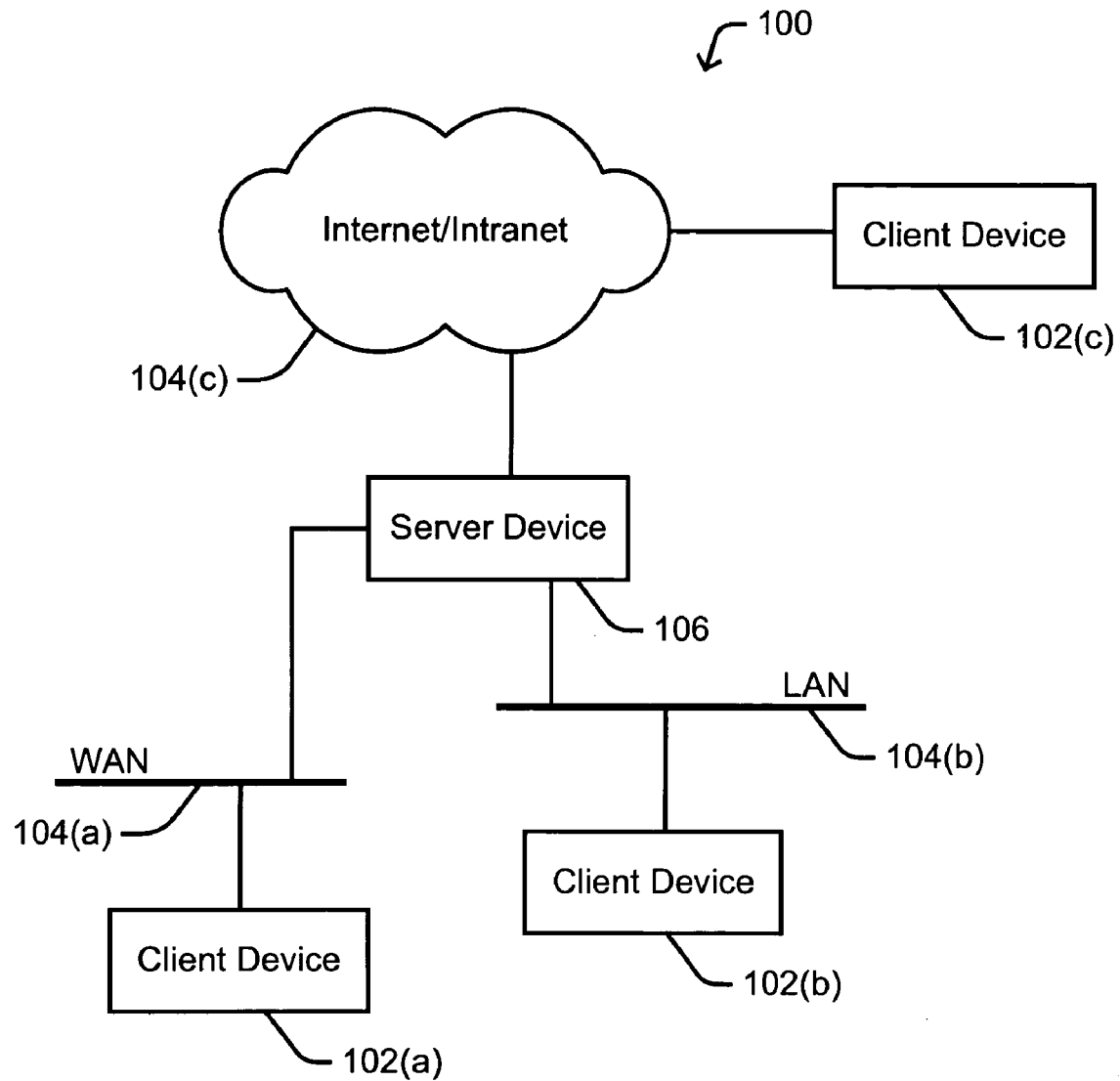
FIG. 1 is a block diagram depicting an exemplary client-server arrangement that spans a plurality of interconnecting networks.

FIG. 1 is a block diagram depicting an exemplary client-server arrangement 100. This interconnected arrangement includes client devices 102(a–c), each being operatively coupled through a respective network 104(a–c) to a server device 106.

As depicted in this simple arrangement, networks 104(a–c) provide two-way communication services between their respective server devices 102(a–c) and server device 106. Networks 104(a–c) may include, for example, one or more routers or like devices that complete the necessary communication paths during a client-server session. Here, for example, networks 104(a–c) may be a packet switched networks that are configured to use Transmission Control Protocol/Internet Protocol (TCP/IP) to transfer information between server device 102 and client device 104 in packets appropriately addressed and delivered via the routers 108. Retransmission services may also be provided for missing/corrupted packets. These and other well known protocols and techniques can be implemented to provide specific services between these communicating devices and/or programs.

Figure 2:
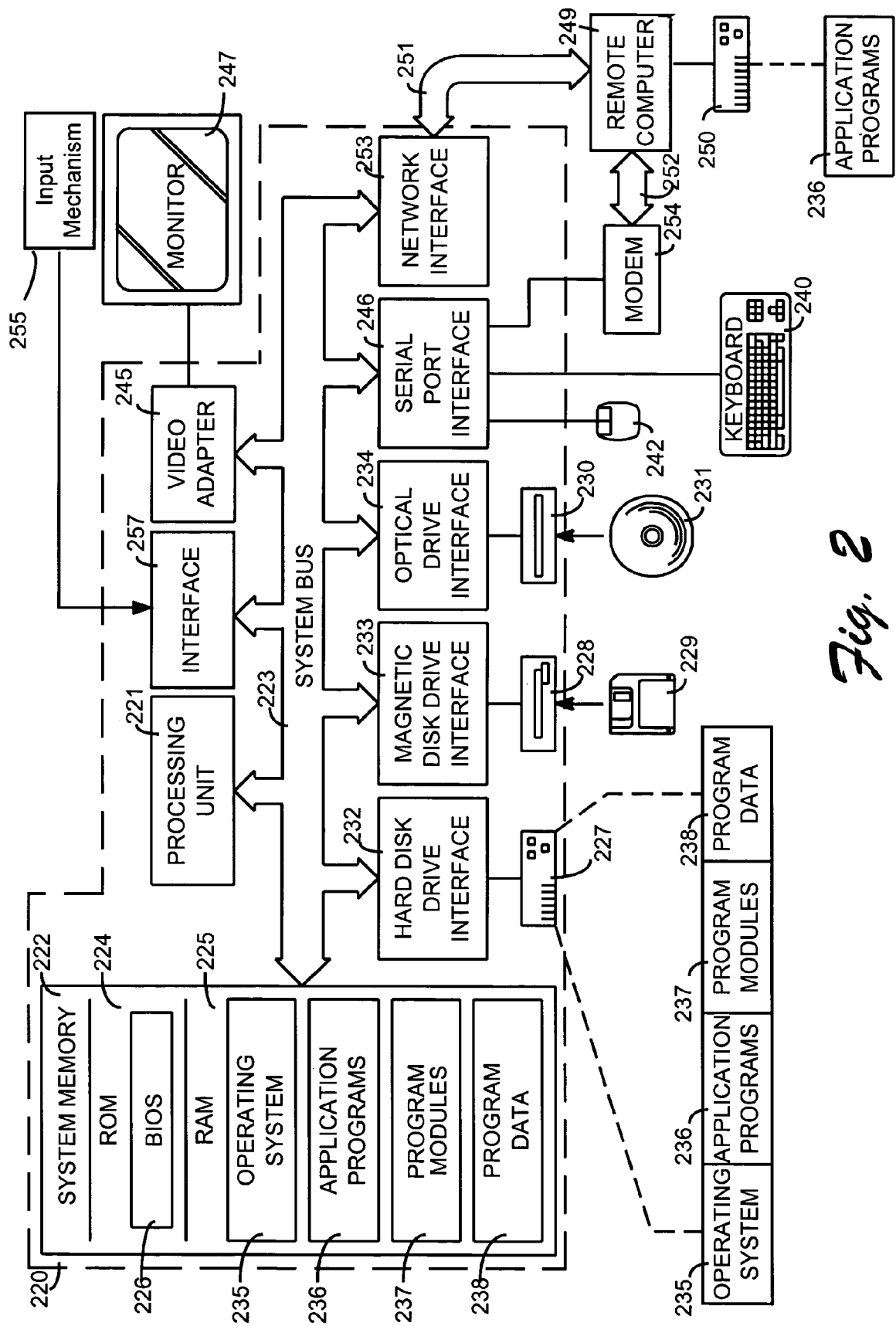
FIG. 2 is a block diagram depicting an exemplary computing system suitable for use as either a server device or as a client device in the arrangement of FIG. 1.

Attention is now drawn to FIG. 2, which is a block diagram depicting an exemplary computing system 200 suitable for use as either server device 106 or as a client device 102(a–c).

Computing system 200 is, in this example, in the form of a personal computer (PC), however, in other examples computing system may take the form of a dedicated server(s), a special-purpose device, an appliance, a handheld computing device, a mobile telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). A camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

In accordance with certain exemplary implementations of the present invention, novel methods and arrangements are provided for creating high-performance network servers that support various access control restrictions. These methods and arrangements provide the technology for the development of highly scalable Internet services, for example, and in doing so provide solutions that tend to be significantly more efficient and more resource-friendly than any of the mechanisms previously in use.

Figure 3:
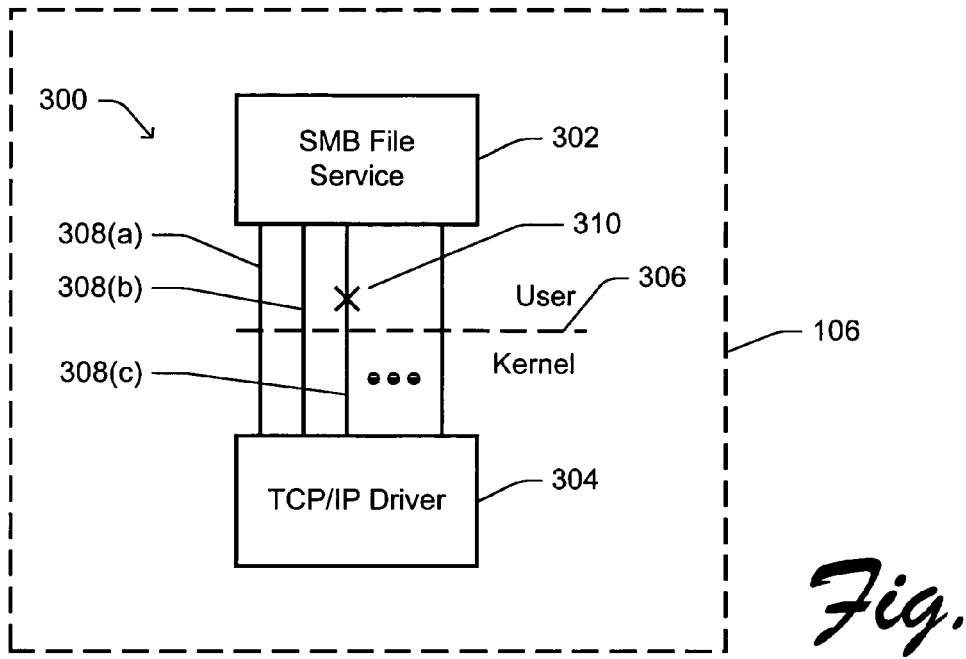
FIG. 3 is a block diagram depicting a conventional server software architecture suitable for use in a server in FIG. 1 for example, having a selected plurality of communication sockets provided between a network interface protocol driver program or the like that is associated with an operating system kernel and an application or the like that is associated with a user program.
Figure 4:
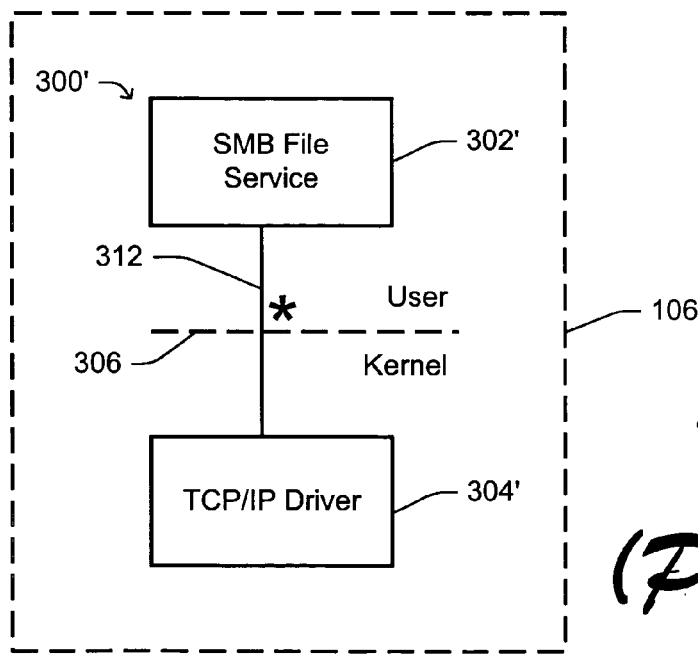

With this in mind, certain existing problems in conventional network servers will now be described with reference to FIGS. 3 and 4. In the examples that follow, the network server is operatively associated with file-sharing software. However, it should be noted that the problems and the various implementations in accordance with the present invention are also applicable to many other, if not all, TCP-based and UDP-based client-server software, including, e.g., HTTP servers, digital media servers, DNS servers, database servers, etc.

There are two mechanisms commonly employed by network servers to selectively restrict the local network interfaces and IP addresses on which requests are accepted. In both of these conventional approaches (which are described below), the network server is first configured with a list of local network interfaces and/or IP addresses on which connection-requests are to be processed.

The first mechanism commonly employed by network servers to selectively restrict the local network interfaces and IP addresses essentially binds sockets to individual IP addresses. An exemplary arrangement is depicted in network server architecture 300 of FIG. 3. As shown in this example, FIG. 3 includes a server device 106 having an SMB file service program 302 that is logically associated with a user-side programming resource, as opposed to an operating system (OS) kernel-side resource 304 (see illustrative demarcation line 306). Here, OS kernel-side resource 304 includes a TCP/IP driver, for example.

As graphically depicted, network server architecture 300 further includes a plurality of listening sockets 308, one bound to each network interface and/or IP address on which connections are permitted. For example, socket 308(*a*) may be bound to listen to network 104(*a*), socket 308(*b*) may be bound to listen to network 104(*b*), and socket 308(*c*) may be bound to listen to network 104(*c*) (see, FIG. 1). Thus, any unauthorized connection requests to network server architecture 300 are simply rejected by OS kernel-side resource 304 since no process is 'listening' for them. For example, assume that socket 308(*c*) is not longer a valid or listened to (as illustrated by crossed lines 310). Any subsequent client requests from client device 102(*c*), for example, will be rejected outright.

At least two significant problems arise with this approach, however. The first problem is that this approach consumes considerable resources and tends to result in very unwieldy source code. Here, for example, network server 300 must now maintain many listening sockets. In the case of large Internet servers, the number of listening sockets may number in the thousands, and each of these sockets consumes scarce kernel-mode resources. This is particularly true when each socket has a corresponding allocation of buffers, its own queue of idle connections, and/or its own queue of unaccepted connections. Moreover, the network server's connection acceptance may be required to pass around arrays of potentially thousands of listening sockets.

The second problem is that this approach usually forces the network server to participate in numerous system events that might affect the status of network interfaces and/or IP addresses. By way of example, network device insertion and removal, IP address addition, removal, reconfiguration, etc. These are all events that are of no concern to a network server that uses only the wildcard IP address, but which must be handled by any network server that binds specifically to particular IP addresses. The resulting source code for simply managing these so-called 'network plug-and-play' events can be quite complicated and is often error-prone.

The second mechanism commonly employed by network servers to selectively restrict the local network interfaces and IP addresses on which requests are accepted takes on a "validation of accepted connections" approach. FIG. 4 depicts an exemplary network server architecture 300' that is similar to network server architecture 300 in FIG. 3. Here, however, network server architecture 300' creates a single listening socket 312 that is bound to a wildcard IP address (e.g., *, or INADDR_ANY) and OS kernel-side resource 304' accepts all connection requests on that socket. Once a connection request is accepted, then SMB file service program 302' then queries a network stack (e.g., a database) to determine the network interface and/or IP address on which the request arrived. If that network interface and/or IP address is not in a list of those permitted, then SMB file service program 302' terminates the previously accepted connection.

Since the connection requests are fully accepted before being subjected to validation, several problems arise. One significant problem, for example, is that network server architecture 300' is susceptible to intentional/unintentional "denial of service" attacks. Even on disabled network interfaces and/or IP addresses, network server architecture 300' can be flooded with connection requests. Since each of the requests are fully accepted before being validated, the resulting connections can accumulate and consume user-side resources faster than SMB file service program 302' can terminate those connections that are not validated.

Another problem is that from the point of view of the network clients, terminating connections after fully accepting a connection request can be quite different from a rejection of a connection request outright. Here, for example, let us assume that client device 102(*c*) does not have permission to access the services of SMB file service program 302'. Theoretically, the desired behavior calls for network server architecture 300' to reject the unauthorized connection request from client device 102(*c*). Unfortunately, this does not occur because the behavior implemented by this conventional approach essentially terminates unauthorized connections. The error code returned to client device 102(*c*) by the former event (i.e., a rejection) is different from that returned by the latter event (i.e., a termination). Consequently, in many situations this difference has produced unacceptable consequences from the point of view of the service being provided, since it becomes impossible for client device 102(*c*) to distinguish between a refusal of service and a failure of service.

With these problems and other known drawbacks in mind, certain exemplary methods and arrangements in accordance with the present invention will now be described in greater detail.

As described below and shown in the corresponding drawings, the various methods and arrangements solve the above problems by essentially shifting responsibility for rejecting unauthorized connection requests to the networking subsystem (e.g., a OS kernel resource 404 in FIG. 5). This reallocation is configured to allow a network server 400 to operate with a single listening socket 408 that is bound to a wildcard IP address or the like.

Figure 5:
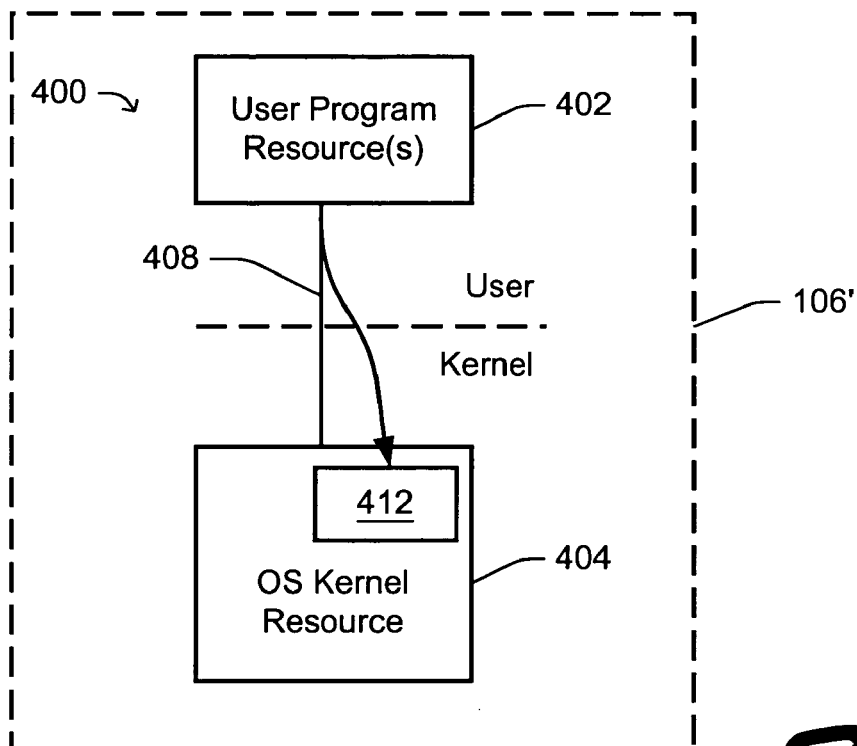
FIG. 5 is a block diagram depicting an improved server software architecture that, in accordance with certain exemplary implementations of the present invention, includes at least one communication socket between an operating system kernel resource and a user program resource and at least one related socket interface list that can be selectively defined by a user program; resource and provided or otherwise made available to the operating system kernel resource.

In the exemplary arrangement in FIG. 5, the information required for the validation/authorization process is provided and/or otherwise made available to OS kernel resource 404 by a user program resource(s) 402. The process of providing the requisite information is illustratively depicted in FIG. 5 by the curved arrow pointing towards a listing 412, which is available to OS kernel resource 404. Note that listing 412 includes information in the form of data, this data can take any conventional form, and can be held in whole or in part(s) within/without network server 400.

Thus, for example, in certain implementations, user program resource 402 specifies an explicit listing 412 of local network interfaces and/or IP addresses on which it wishes to accept connection requests on socket 408. The networking subsystem, in this example OS kernel resource 404, then essentially treats socket 408 as if the network server 400 bound it not to the wildcard IP address, but instead to all of the network interfaces and/or IP addresses specified.

Several benefits arise from this approach. First, network server 400 will be immune from denial of service attacks on its unauthorized network interfaces and/or IP addresses, since OS kernel resource 404 has all the information it needs to reject connection requests promptly. Secondly, client devices 102 are able to distinguish clearly between refusal of service and failure of service, since this approach relies on OS kernel resource 404 to reject connection requests rather than relying on the network server (e.g., user program resources 402) to terminate accepted connections. Thirdly, network server 400 has only one socket to manage, rather than thousands. Fourthly, in the case where the listing 412 of authorized local network interfaces and/or IP addresses contains thousands of items, the resource consumption of the list in kernel-mode is an order of magnitude lower than the resource consumption would be if one full socket were opened for each item. Additionally, network server 400 need not implement code for processing network plug-and-play events, since it never actually binds specifically to any particular IP addresses.

Figure 6:
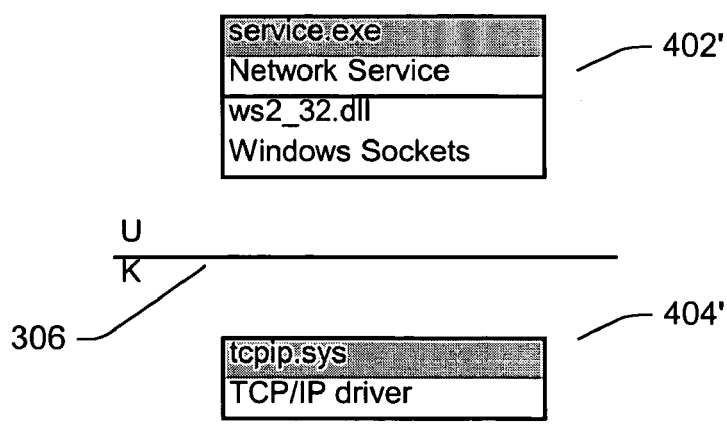
FIG. 6 is a block diagram depicting an improved server architecture as in FIG. 5 suitable for certain Microsoft Windows™ computing environments, in accordance with certain further exemplary implementations of the present invention.

Reference is now made to FIG. 6, which depicts in similar fashion to FIG. 5, one exemplary implementation of a network server 400' that is suitable for use in a Windows™ operating environment. Here, as a result of the above described methods and arrangements, a conventional Windows™ Sockets API was modified to provide support for specifying a listing of local network interfaces and/or IP addresses on sockets. This is illustratively represented by the shaded block within user program resource 402', and described in greater detail below. OS kernel resource 404' has also been modified to provide the requisite support in the Windows™ networking subsystem for rejecting connection requests or datagrams on behalf of network server 400'.

Figure 7:
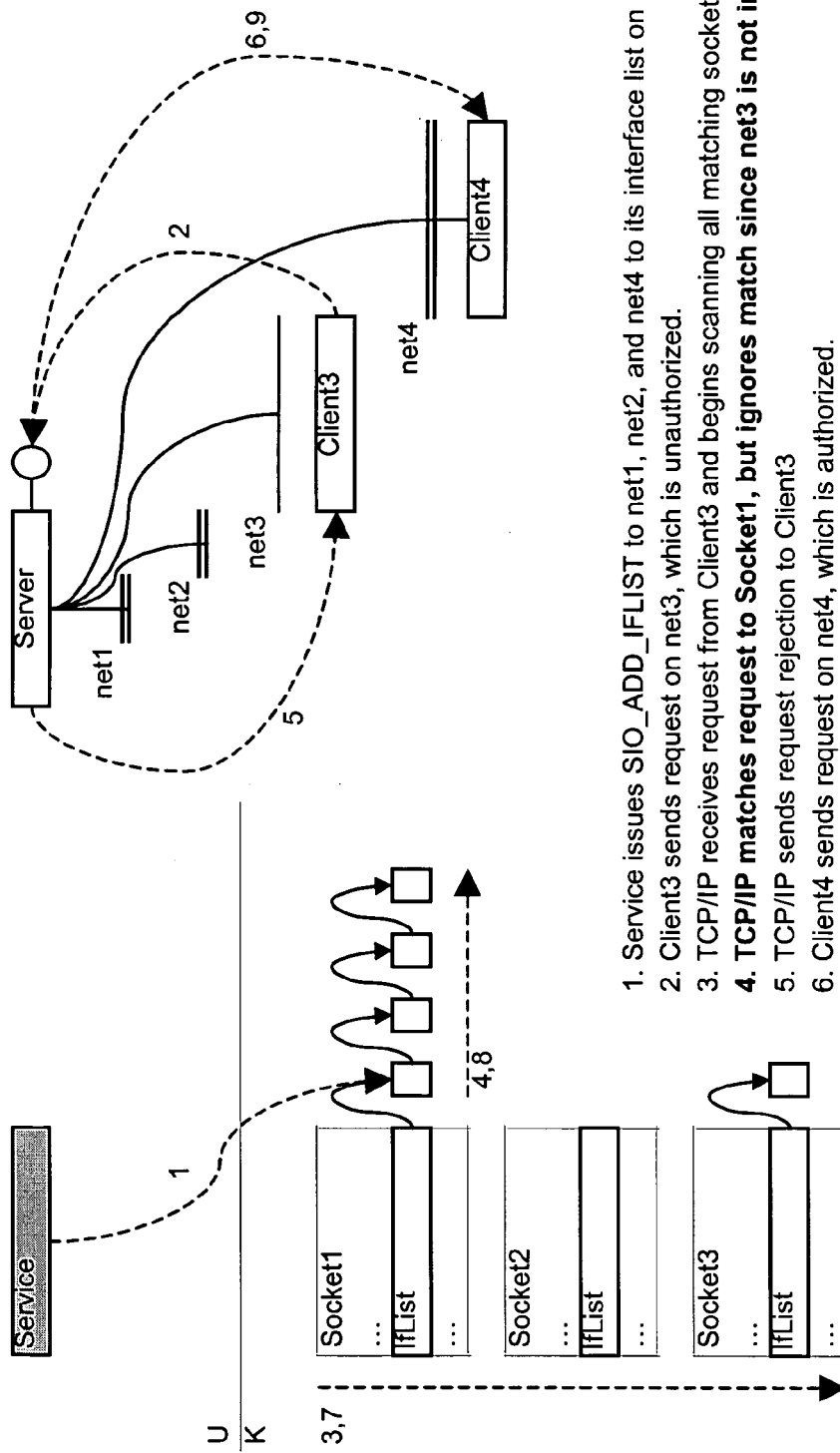
FIG. 7 is an operational block diagram depicting an exemplary client-server communication process over a plurality of networks having servers configured in accordance with certain implementations of present invention, for example, as in FIG. 5.

FIG. 7 is block diagram that builds upon the above examples and illustrates an exemplary logical process based on an operational scenario. Here, it is assumed that the exemplary sockets API further includes socket I/O control logic. The socket I/O control is essentially issued by a network server on a socket to specify the listing of network interfaces on which the server is willing to accept connections (e.g., in the case of listening TCP sockets) or receive datagrams (e.g., in the case of UDP sockets). Here, listing 412 is termed an "IfList".

The following exemplary controls may be included in the socket I/O control logic:

SIO_IFLIST—set to a non-zero value to treat the socket as if it is bound only to those interfaces set via an SIO_ADD_IFLIST. When set to a zero value, this clears the network interface list and restores a wildcard normal operation.

SIO_ADD_IFLIST—atomically adds one or more local network interfaces to the list of authorized interfaces for the socket.

SIO_DEL_IFLIST—atomically removes one or more local network interfaces from the list of authorized interfaces for the socket.

Certain implementations, for example, also extend the Windows™ networking subsystem with support for the SIO_IFLIST I/O control in a socket-management module and an input-processing module (neither of which are shown).

Continuing with the example above and with specific reference to FIG. 7, each socket includes an additional field: the IfList field, which holds a NULL-terminated list of the network interfaces on which requests are authorized for the socket.

When the SIO_IFLIST I/O control is issued by an application (e.g., user program resource 402 or 402'), the networking subsystem (e.g., OS kernel resource 404 or 404') initializes the IfList field to be empty. When the SIO_ADD_IFLIST I/O control is issued, the network interface(s) specified is (are) added to the IfList field (e.g., listing 412), if not already present. When the SIO_DEL_IFLIST I/O control is issued, the network interface(s) specified is (are) removed from the IfList field, if present.

When an incoming connection request is matched to a listening TCP socket or an incoming datagram is matched to a UDP socket, the networking subsystem determines whether the IfList field is non-empty. If so, the networking subsystem searches the contents of the IfList field to determine whether the receiving network interface is present in the list of authorized interfaces. If the receiving network interface is present in the list, then it is processed normally and the connection request accepted or the datagram delivered. Otherwise, the networking subsystem discards the previous match (i.e. no longer considers the socket to be a match) and continues searching for a matching socket as though no match had been found. If no other sockets match the incoming message, then the message is rejected as though no match had been found; for TCP connection requests, a TCP reset is sent, while for UDP datagrams, an ICMP destination unreachable message is sent.

FIG. 7 provides additional descriptive text for steps 1 through 9 associated with an exemplary attempted connection operation. Here, the numbered dashed arrows illustrate the functional flow associated with the corresponding numbered steps.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for controlling access to a server device by at least one client device that is operatively coupled to the server device through at least one interconnecting network, the method comprising:

causing a user-side portion of a network server logic within the server device to selectively specify at least one network from which the user-side portion would accept client device information;

causing a kernel-side portion of the network server logic to accept the client device information only if the client device information has been provided via the specified network; and if the client device information has not been provided via the specified network, causing the kernel-side portion to reject the client device information and notify the client device in a manner that identifies the rejection, wherein the kernel-side portion notifies the client device using at least one message selected from a group of messages comprising a TCP reset message and an ICMP destination unreachable message, as applicable.

2. The method as recited in claim 1, further comprising:

providing a communication socket for use by the kernel-side portion; and causing the kernel-side portion to compare client device information received on the communication socket to the specified network.

3. The method as recited in claim 1, wherein causing the user-side portion to selectively specify at least one network from which the user-side portion would accept the client device information, further includes causing the user-side portion to selectively specify a plurality of networks from which the user-side portion would accept the client device information; and wherein causing the kernel-side portion to accept the client device information only if the client device information has been provided via the specified network, further includes causing the kernel-side portion to accept the client device information only if the client device information has been provided via at least one of the specified plurality of networks.

4. The method as recited in claim 1, wherein causing the user-side portion to selectively specify the at least one network from which the user-side portion would accept the client device information further includes having the user-side portion specify at least one local network interface.

5. The method as recited in claim 1, wherein causing the user-side portion to selectively specify the at least one network from which the user-side portion would accept the client device information further includes having the user-side portion specify at least one IP address.

6. The method as recited in claim 1, wherein the network server logic is operatively configured to support at least one client-server based process selected from a group of processes comprising a file-sharing communication process, a TCP-based communication process, a UDP-based communication process, a HTTP-based communication process, a digital media based communication process, a DNS-based communication process, and a database related communication process.

7. The method as recited in claim 1, wherein the user-side portion includes an application-programming interface (API) operatively configured to allow an application to specify the at least one network from which the user-side portion would accept the client device information.

8. The method as recited in claim 7, wherein the API is further operatively configured to allow the application to specify a listing of networks from which the user-side portion would accept the client device information.

9. The method as recited in claim 8, wherein the API is further operatively configured to allow the application to selectively modify the listing of networks from which the user-side portion would accept the client device information.

10. The method as recited in claim 1, wherein the kernel-side portion includes a TCP/IP driver.

11. A computer-readable medium having computer-executable instructions for performing steps comprising:
    causing a user-side portion of a network server logic within a server device to selectively specify at least one network from which the user-side portion would accept client device information;
    causing a kernel-side portion of the network server logic to accept the client device information only if the client device information has been provided via the specified network; and
    if the client device information has not been provided via the specified network causing the kernel-side portion to reject the client device information and notify the client device in a manner that identifies the rejection, wherein the kernel-side portion notifies the client device using at least one message selected from a group of messages comprising a TCP reset message and an ICMP destination unreachable message, as applicable.

12. The computer-readable medium as recited in claim 11, further comprising computer-executable instructions for:
    providing a communication socket for use by the kernel-side portion; and
    causing the kernel-side portion to compare client device information received on the communication socket to the specified network.

13. The computer-readable medium as recited in claim 11, wherein causing the user-side portion to selectively specify at least one network from which the user-side portion would accept the client device information, further includes causing the user-side portion to selectively specify a plurality of networks from which the user-side portion would accept the client device information; and
    wherein causing the kernel-side portion to accept the client device information only if the client device information has been provided via the specified network, further includes causing the kernel-side portion to accept the client device information only if the client device information has been provided via at least one of the specified plurality of networks.

14. The computer-readable medium as recited in claim 11, wherein causing the user-side portion to selectively specify the at least one network from which the user-side portion would accept the client device information further includes having the user-side portion specify at least one local network interface.

15. The computer-readable medium as recited in claim 11, wherein causing the user-side portion to selectively specify the at least one network from which the user-side portion would accept the client device information further includes, having the user-side portion specify at least one IP address.

16. The computer-readable medium as recited in claim 11, wherein the network server logic is operatively configured to support at least one client-server based process selected from a group of processes comprising a file-sharing communication process, a TCP-based communication process, a UDP-based communication process, a HTTP-based communication process, a digital media based communication process, a DNS-based communication process, and a database related communication process.

17. The computer-readable medium as recited in claim 11, wherein the user-side portion includes an application-programming interface (API) operatively configured to allow an application to specify the at least one network from which the user-side portion would accept the client device information.

18. The computer-readable medium as recited in claim 17, wherein the API is further operatively configured to allow the application to specify a listing of networks from which the user-side portion would accept the client device information.

19. The computer-readable medium as recited in claim 18, wherein the API is further operatively configured to allow the application to selectively modify the listing of networks from which the user-side portion would accept the client device information.

20. The computer-readable medium as recited in claim 11, wherein the kernel-side portion includes a TCP/IP driver.

21. An apparatus comprising:
    memory; and
    network server logic, operatively coupled to the memory and configurable to support at least one client-server communication session, the network server logic having:
    a user-side portion that is configured to selectively specify at least one network from which the user-side portion would accept client device information, and
    a kernel-side portion that is configured to accept the client device information only if the client device information has been provided via the specified network,
    wherein if the client device information has not been provided via the specified network, the kernel-side portion is further configured to reject the client device information and notify the client device in a manner that identifies the rejection, and wherein the kernel-side portion is further configured to notify the client device using at least one message selected from a group of messages comprising a TCP reset message and an ICMP destination unreachable message, as applicable.

22. The apparatus as recited in claim 21, further comprising:
a communication socket for use by the kernel-side portion during the communications session, and wherein the kernel-side portion is further configured to compare client device information received on the communication socket to the specified network.

23. The apparatus as recited in claim 21, wherein the user-side portion is further configured to selectively specify a plurality of networks from which the user-side portion would accept the client device information; and
wherein the kernel-side portion is further configured to accept the client device information only if the client device information has been provided via at least one of the specified plurality of networks.

24. The apparatus as recited in claim 21, wherein the user-side portion is further configured to specify at least one local network interface.

25. The apparatus as recited in claim 21, wherein the user-side portion is further configured to specify at least one IP address.

26. The apparatus as recited in claim 21, wherein the communication session is further configured to support at least one communication process selected from a group of communication processes comprising a file-sharing communication process, a TCP-based communication process, a UDP-based communication process, a HTTP-based communication process, a digital media based communication process, a DNS-based communication process, and a database related communication process.

27. The apparatus as recited in claim 21, wherein the user-side portion includes:
an application-programming interface (API) operatively configurable to allow an application to specify the at least one network from which the user-side portion would accept the client device information.

28. The apparatus as recited in claim 27, wherein the API is further operatively configurable to allow the application to specify a listing of networks from which the user-side portion would accept the client device information.

29. The apparatus as recited in claim 28, wherein the API is further operatively configurable to allow the application to selectively modify
the listing of networks from which the user-side portion would accept the client device information.

30. The apparatus as recited in claim 21, wherein the kernel-side portion includes a TCP/IP driver.

* * * * *